US008588971B2

(12) United States Patent
Udono

(10) Patent No.: US 8,588,971 B2
(45) Date of Patent: *Nov. 19, 2013

(54) LOCOMOTIVE PERFORMANCE TESTING APPARATUS

(75) Inventor: Kenro Udono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1015 days.

This patent is subject to a terminal disclaimer.

(21) Appl. No.: 12/376,192

(22) PCT Filed: Oct. 2, 2007

(86) PCT No.: PCT/JP2007/069255
§ 371 (c)(1),
(2), (4) Date: Feb. 3, 2009

(87) PCT Pub. No.: WO2008/053658
PCT Pub. Date: May 8, 2008

(65) Prior Publication Data
US 2010/0010668 A1 Jan. 14, 2010

(30) Foreign Application Priority Data

Nov. 1, 2006 (JP) .................................. 2006-298178

(51) Int. Cl.
*G06F 19/00* (2011.01)
(52) U.S. Cl.
USPC ........... 700/245; 700/250; 700/253; 700/254; 700/259; 700/264
(58) Field of Classification Search
USPC .................. 482/51, 54, 70; 73/1.08
See application file for complete search history.

(56) References Cited

U.S. PATENT DOCUMENTS

| | | | | |
|---|---|---|---|---|
| 4,204,673 A | * | 5/1980 | Speer, Sr. ................. | 482/5 |
| 4,423,864 A | * | 1/1984 | Wiik ........................ | 472/91 |
| 5,336,146 A | * | 8/1994 | Piaget et al. ............. | 482/54 |

(Continued)

FOREIGN PATENT DOCUMENTS

| | | |
|---|---|---|
| GB | 2311976 | 10/1997 |
| JP | H06-15658 | 3/1994 |

(Continued)

OTHER PUBLICATIONS

"Development and Evaluation of Split Belt Treadmill for a Small Bipedal Robot", Kazuki Koide et al., IEICE Technical Report, Mar. 11, 2004, vol. 103, No. 731, pp. 11 to 16, (English abstract included).

(Continued)

*Primary Examiner* — Bhavesh V. Amin
(74) *Attorney, Agent, or Firm* — Rankin, Hill & Clark LLP

(57) ABSTRACT

Provided is a locomotive performance testing apparatus capable of testing the locomotive performance of a test subject while keeping the test subject at a suitable position on a treadmill. According to the locomotive performance testing apparatus (1), a robot (2) is moving its legs (22) toward a second direction on a plurality of endless belts (11) which are rotationally driven by a plurality of motors (12), respectively. In this situation, a positional deviation or the like of the robot (2) from a first desired position in a first direction different from a second direction is determined as a first deviation. Moreover, motions of the plurality of motors (12) are individually controlled to offset the first deviation.

13 Claims, 4 Drawing Sheets

(56) References Cited

U.S. PATENT DOCUMENTS

| | | | |
|---|---|---|---|
| 5,368,532 A | | 11/1994 | Farnet |
| 5,372,560 A * | | 12/1994 | Chang .............................. 482/54 |
| 5,476,429 A * | | 12/1995 | Bigelow et al. ................. 482/54 |
| 5,607,376 A * | | 3/1997 | Magid .............................. 482/54 |
| 5,913,684 A * | | 6/1999 | Latham et al. ................. 434/247 |
| 6,135,928 A | | 10/2000 | Butterfield |
| 6,162,151 A * | | 12/2000 | Tani et al. ........................ 482/54 |
| 6,217,487 B1 * | | 4/2001 | Reinert ............................. 482/54 |
| 6,273,844 B1 * | | 8/2001 | Kelsey et al. .................... 482/54 |
| 6,645,126 B1 * | | 11/2003 | Martin et al. .................... 482/54 |
| 6,666,831 B1 * | | 12/2003 | Edgerton et al. .............. 600/587 |
| 6,749,541 B1 * | | 6/2004 | Martin ............................. 482/54 |
| 6,811,517 B1 * | | 11/2004 | Eschenbach ..................... 482/52 |
| 6,811,519 B2 * | | 11/2004 | Kuo ................................. 482/54 |
| 6,880,487 B2 * | | 4/2005 | Reinkensmeyer et al. ... 119/700 |
| 7,125,388 B1 * | | 10/2006 | Reinkensmeyer et al. ........ 601/5 |
| 7,980,856 B2 * | | 7/2011 | Grabiner et al. .............. 434/258 |
| 8,002,674 B2 * | | 8/2011 | Piaget et al. ..................... 482/52 |
| 2002/0010056 A1 * | | 1/2002 | Borsheim ........................ 482/66 |
| 2002/0157617 A1 * | | 10/2002 | Reinkensmeyer et al. ... 119/728 |
| 2003/0004038 A1 * | | 1/2003 | Wroclawsky ................... 482/54 |
| 2004/0097330 A1 * | | 5/2004 | Edgerton et al. .................. 482/1 |
| 2004/0192514 A1 * | | 9/2004 | Piaget et al. ..................... 482/54 |
| 2005/0233864 A1 * | | 10/2005 | Smith et al. ..................... 482/52 |
| 2005/0245359 A1 * | | 11/2005 | Lo .................................... 482/54 |
| 2006/0052728 A1 * | | 3/2006 | Kerrigan et al. .............. 600/595 |
| 2006/0247104 A1 * | | 11/2006 | Grabiner et al. ................. 482/54 |
| 2007/0016116 A1 * | | 1/2007 | Reinkensmeyer et al. ........ 601/5 |
| 2010/0000345 A1 * | | 1/2010 | Udono ........................ 73/865.9 |

FOREIGN PATENT DOCUMENTS

| | | |
|---|---|---|
| JP | 07-136295 | 5/1995 |
| JP | 07-236669 | 9/1995 |
| JP | 10-071216 | 3/1998 |
| JP | 11-137718 | 5/1999 |
| JP | 2000-206862 | 7/2000 |
| JP | 2001-198234 | 7/2001 |
| WO | 98/08572 | 3/1998 |

OTHER PUBLICATIONS

L. Jensen, et al; "Learning Effects During Human Spilt-Belt Walking: Influence of Afferent Input", Engineering in Medicine and Biology Society, 1996; 18th Annual International Conference of the IEEE Amsterdam, Netherlands Oct. 31-Nov. 3, 1996. vol. 2., pp. 633-634; ISBN: 978-0-7803-3811-1.

\* cited by examiner

LOCOMOTIVE PERFORMANCE TESTING APPARATUS

PRIORITY CLAIM

The present application is based on and claims the priority benefit of Japanese Patent Application 2006-298178 filed on Nov. 1, 2006, the contents of which are incorporated herein by reference in its entirety.

BACKGROUND OF THE INVENTION

1. Field of the Invention

The present invention relates to a locomotive performance testing apparatus configured to test locomotive performance of a test subject such as a robot or the like locomobile according to movements of a plurality of legs by leaving the ground and landing on the ground, respectively.

2. Description of the Related Art

There has been disclosed a treadmill configured to adjust a rotating velocity of an endless belt driven by a motor according to an anteroposterior position of a runner (test subject) subjected to a walking or running training on the endless belt (for example, refer to paragraphs 0010 to 0014 and FIG. 3 in Japanese Patent Laid-open No. H07-136295, and paragraphs 0005 to 0007 and FIG. 1 in Japanese Patent Laid-open No. H10-071216).

However, in the case where the position of the test subject walking or running on the treadmill is deviated laterally, or in the case where the walking or running direction of the test subject is changed, it is possible that the test subject will deviate from the treadmill.

SUMMARY OF THE INVENTION

The present invention has been accomplished in view of the aforementioned problem, and it is therefore an objective of the present invention to provide a locomotive performance testing apparatus capable of testing the locomotive performance of a movable test subject while maintaining the test subject at a suitable position on a treadmill.

According to a first aspect of the present invention, there is provided a locomotive performance testing apparatus configured to test locomotive performance of a test subject capable of moving according to movements of a plurality of parts thereof, including: a plurality of endless belts; a plurality of motors to drive the plurality of endless belts to rotate, respectively; a first processing element configured to determine a directional deviation of the test subject deviated from a second direction or a positional deviation of the test subject deviated from a first desired position in a first direction different from the second direction as a first deviation when the plurality of parts are activated to move the test subject toward the second direction on the plurality of rotating endless belts driven by the plurality of motors, respectively; and a motor controlling element configured to control motions of the plurality of motors, respectively, so as to offset the first deviation determined by the first processing element.

According to the locomotive performance testing apparatus of the first aspect of the present invention, the locomotive performance of the test subject is tested by moving the plurality of parts of the test subject on the plurality of endless belts driven to rotate individually. Moreover, in the case where the moving direction of the test subject is deviated from the second direction (for example, the frontward direction) due to the reasons such as the plurality of parts become unbalanced or the like in moving during the test, or in the case where the position of the test subject is deviated from the first desired position in the first direction (for example, the lateral direction) different from the second direction, the motions of the plurality of motors are controlled so as to offset the deviation (the first deviation).

Accordingly, the unbalance or the like of the movements of the plurality of parts is corrected by making the plurality of endless belts rotate at different velocities, respectively. Therefore, the locomotive performance of the test subject may be performed so as to match the direction of the test subject to the second direction or match the position of the test subject to the first desired position in the first direction.

The locomotive performance testing apparatus of a second aspect of the present invention is dependent on the first aspect of the present invention, wherein the motor controlling element configured to control the motions of the plurality of motors, respectively, in a manner different from a normal one when the first deviation determined by the first processing element is beyond a first allowable range.

According to the locomotive performance testing apparatus of the second aspect of the present invention, in the case where the first deviation is beyond the first allowable range, by taking measures different from the normal ones, such as stopping the motions of the motors or the like, it is possible to prevent the test subject from departing from the endless belts to contact the objects around the apparatus.

The locomotive performance testing apparatus of a third aspect of the present invention is dependent on the first aspect of the present invention, further includes a second processing element configured to determine a positional deviation of the test subject deviated from a second desired position in the second direction as a second deviation when the plurality of parts are activated to move the test subject toward the second direction on the plurality of rotating endless belts driven by the plurality of motors, respectively, and the motor controlling element configured to control the motions of the plurality of motors, respectively, so as to offset the first deviation determined by the first processing element and the second deviation determined by the first processing element, respectively.

According to the locomotive performance testing apparatus of the third aspect of the present invention, in the case where the position of the test subject is deviated from the desired position in the second direction due to the reason that a tempo or the like of the movements of the plurality of parts has been changed during the test, the motions of the plurality of motors are controlled so as to offset the deviation (the second deviation). Accordingly, the tempo alteration of the movements of the plurality of parts may be appropriately offset according to the motions of the endless belts. Therefore, the locomotive performance of the test subject may be performed while maintaining the position of the test subject at the desired position in the second direction.

The locomotive performance testing apparatus of a fourth aspect of the present invention is dependent on the third aspect of the present invention, wherein the motor controlling element configured to control the motions of the plurality of motors, respectively, in a manner different from the normal one when the second deviation determined by the second processing element is beyond a second allowable range.

According to the locomotive performance testing apparatus of the fourth aspect of the present invention, in the case where the second deviation is beyond the second allowable range, by taking measures different from the normal ones, such as stopping the motions of the motors or the like, it is possible to prevent the test subject from departing from the endless belts to contact the objects around the apparatus.

The locomotive performance testing apparatus of a fifth aspect of the present invention is dependent on the first aspect of the present invention, further includes a drive mechanism to elevate the test subject so as to make the plurality of parts secede from the plurality of endless belts.

According to the locomotive performance testing apparatus of the fifth aspect of the present invention, in the case where the posture of the test subject is possible to become unbalanced due to the reason that the movements of the test subject are not matched to the motions of the plurality of endless belts, this kind of possibility may be avoided by elevating the test subject.

The locomotive performance testing apparatus of a sixth aspect of the present invention is dependent on the first aspect of the present invention, wherein the plurality of endless belts are a pair of endless belts, the test subject is a robot and the plurality of parts are a pair of legs of the robot; the pair of endless belts are disposed in parallel according to the displacement of the pair of legs.

According to the locomotive performance testing apparatus of the sixth aspect of the present invention, the locomotive performance on walking or running due to the movements of the plurality of legs of the robot may be performed so as to match the direction of the robot to the second direction, or match the position of the robot to the first desired position in the first direction.

The locomotive performance testing apparatus of a seventh aspect of the present invention which tests locomotive performance of a robot locomobile according to movements including leaving the ground and landing on the ground of a plurality of legs of the robot, respectively, includes: an endless belt; a plurality of motors to drive the endless belt to rotate; a first processing element configured to determine a positional deviation of the robot deviated from a first desired position in a first direction different from a second direction as a first deviation when the plurality of legs are activated to move the robot toward the second direction on the rotating endless belt driven by the plurality of motors; and a motor controlling element configured to control motions of the plurality of motors, respectively, so as to offset the first deviation determined by the first processing element.

According to the locomotive performance testing apparatus of the seventh aspect of the present invention, in the case where the position of the robot is deviated from the first desired position in the first direction (for example, the lateral direction) due to the reason that the tempo or the like of the movements of the plurality of legs has been altered during the test, the motions of one motor are controlled so as to offset the deviation (the first deviation). Accordingly, the tempo alteration of the movements of the plurality of legs may be appropriately offset according to the motions of the endless belt. Therefore, the locomotive performance of the robot may be performed so as to match the position of the robot to the first desired position in the first direction.

DETAILED DESCRIPTION OF THE PREFERRED EMBODIMENTS

Figure 1:
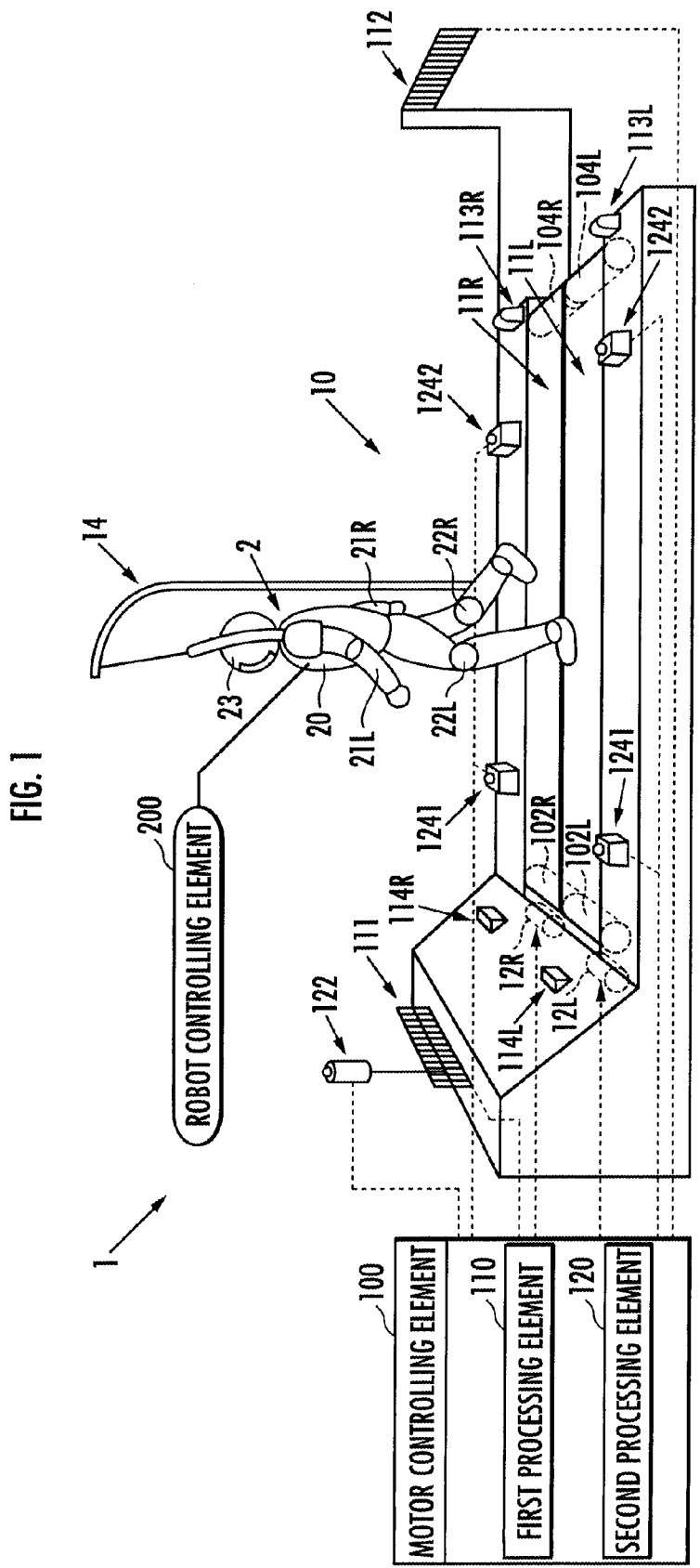
FIG. 1 is a diagram illustrating the configuration of a locomotive performance testing apparatus of the present invention.

Hereinafter, embodiments of a locomotive performance testing apparatus according to the present invention will be described with reference to the drawings.

First, the configuration of the locomotive performance testing apparatus will be explained with reference to FIG. 1 and FIG. 2. Hereinafter, numerals L and R are used to denote the left and right components, respectively. However, in the case where the left component and the right component are common or the left and right components are referred integrally, the numerals will be omitted where appropriate.

The locomotive performance testing apparatus 1 is used to test the locomotive performance of a robot 2 or the like, includes a treadmill 10, a monitor which displays the locomotive performance of the robot 2 or other measuring devices 16 (refer to FIG. 2), and a motor controlling element 100.

The treadmill 10 includes a pair of endless belts 11L and 11R which are disposed in parallel, 2 motors 12L and 12R which drives respectively the pair of endless belts 11L and 11R to rotate, and a lifter 14 which suspends the robot 2 to allow a free movement of the robot 2 vertically.

The endless belt 11L is wrapped across a pair of rollers 102L and 102R. The endless belt 11R is wrapped across a pair of rollers 104L and 104R. The rollers 102L and 102R are driven by the motors 12L and 12R to rotate the endless belts 11L and 11R, respectively. Each of the motors 12L and 12R is provided with an encoder (not shown) which outputs a signal according to its rotating velocity.

The treadmill 10 is provided with an array of light emitting elements 111 disposed in parallel at an anterior part thereof and an array of light receiving elements (a first sensor) 112 disposed in parallel at a posterior part thereof. The array of light receiving elements 112 detects the light emitted from the array of light emitting elements 111. The working state of the first sensor 112, in other words, the light receiving state and the non-light receiving state of each of the light receiving elements which constitute the first sensor 112, alters according to the standing position of the robot 2 in the lateral direction (first direction). The left and right sides of the anterior part of the treadmill 10 are disposed with first limit sensors 114L and 114R which emit lights toward reflectors 113L and 113R disposed at the left and right sides of the posterior part of the treadmill 10 and detect the lights reflected from the reflectors 113L and 113R, respectively. The first limit sensor 114L outputs a signal on the basis of a condition whether a part of the robot 2 is beyond of the left side of an allowable area on the treadmill 10; on the other hand, the first limit sensor 114R outputs a signal if a part of the robot 2 is beyond the right side of the allowable area on the treadmill 10.

The anterior part of the treadmill 10 is disposed with a second sensor 122 which emits laser lights to the robot 2 and on the basis of the laser lights reflected from the robot 2, outputs a signal in response to the standing position of the robot 2 in the anteroposterior direction (second direction). The left and right sides of the anterior part of the treadmill 10 are disposed respectively with a pair of second limit sensors 1241. The left and right sides of the posterior part of the treadmill 10 are disposed respectively with a pair of second limit sensors 1242. The second limit sensor 1241 outputs a signal on the basis of a condition whether a part of the robot 2 is beyond the front side of the allowable area on the treadmill 10; on the other hand, the second limit sensor 1242 outputs a signal if a part of the robot 2 is beyond the rear side of the allowable area on the treadmill 10.

The motor controlling element 100 is comprised of a CPU, a ROM, a RAM, an I/O and the like and is provided with a first processing element 110 and a first processing element 120. The motor controlling element 100 controls the motions of the motors 12L and 12R individually so as to offset a first deviation determined by the first processing element 110 and a second deviation determined by the first processing element 120.

The first processing element 110 determines the deviation of the position of the robot 2 from a first position in the first direction (the lateral direction of the treadmill 10) as the first deviation.

The second processing element 120 determines the deviation of the position of the robot 2 from a second desired position in the second direction orthogonal to the first direction (the anteroposterior direction of the treadmill 10) on the basis of the output from the second sensor 122 as the second deviation.

The robot 2 includes a body (a trunk) 20, a pair of arms 21 extended from both sides of an upper section of the body 20, a pair of left and right legs 22 extended from a lower section of the body 20, a head 23 disposed upper of the body 20, and a robot controlling element 200 configured to control the movements of the legs 22 and the like. The robot 2 can walk or run by making the pair of left and right legs 22 leave and land on the ground respectively.

Subsequently, a testing method of the locomotive performance of the robot 2 by the locomotive performance testing apparatus 1 having the aforementioned configuration will be described with reference to FIG. 3 and FIG. 4.

First, the robot 2 is transported while suspended by the lifter 14 and is located at an initial position in such a way that the left leg 22L and the right leg 22R stand on the motionless endless belts 11L and 11R, respectively. The initiation of walking or running of the robot 2 actuates the motors 12L and 12R, respectively, and the endless belts 11L and 11R are driven to rotate at the same velocity. The initiation of the movements of the robot 2 may be detected by, for example, the motor controlling element 100 on the basis of the output of the second sensor 122. It may also be detected by the motor controlling element 100 on the basis of communication with the robot controlling element 200 of the robot 2.

Figure 2:
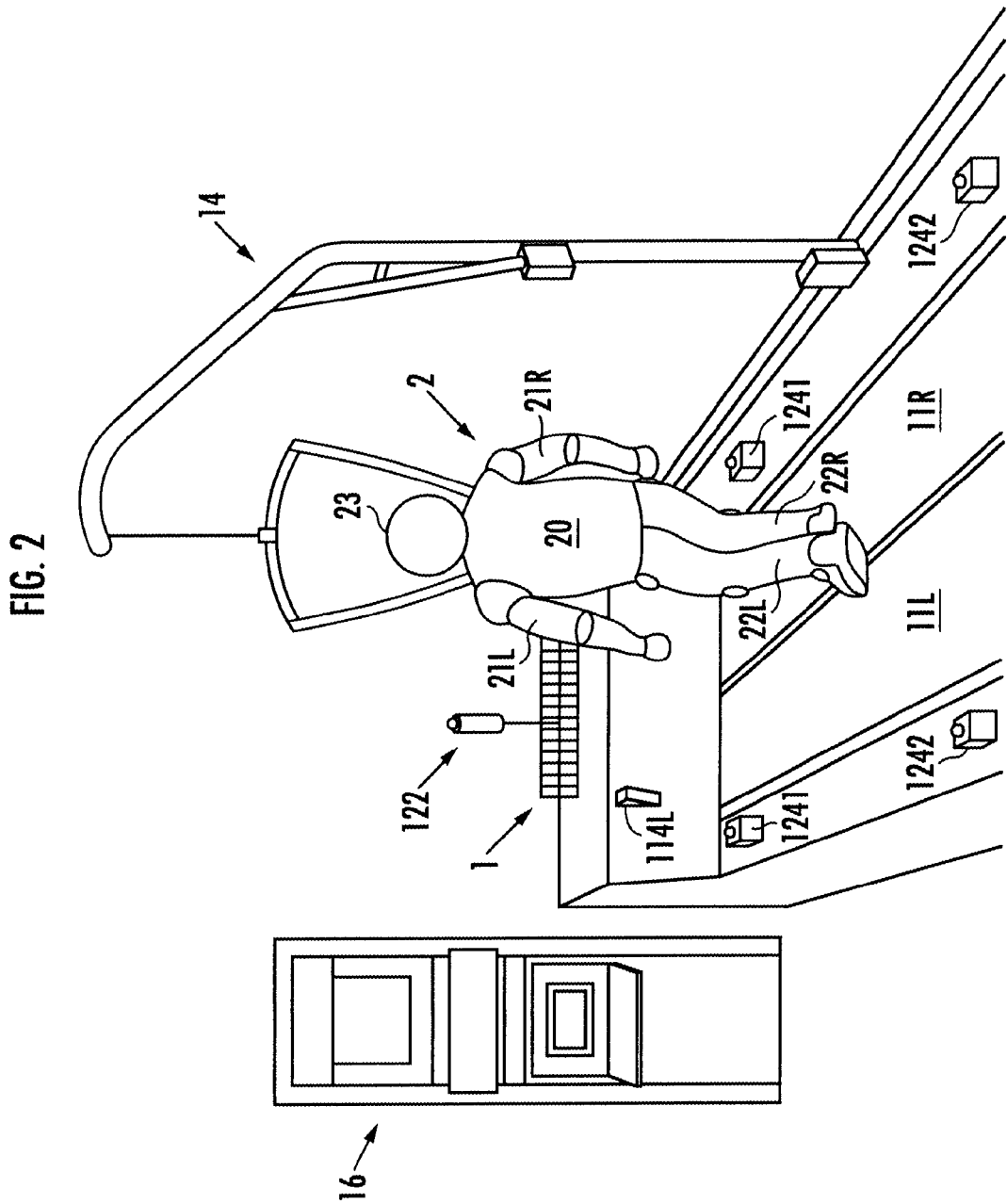
FIG. 2 is a diagram illustrating the configuration of the locomotive performance testing apparatus of the present invention.

As illustrated in FIG. 1 and FIG. 2, the robot 2 may lifted by the lifter 14 via belts attached to the left and right shoulders and the locomotive performance thereof is tested on such a situation. Note that the locomotive performance of the robot 2 may also be tested while being freed from the lifter 14.

Figure 3:
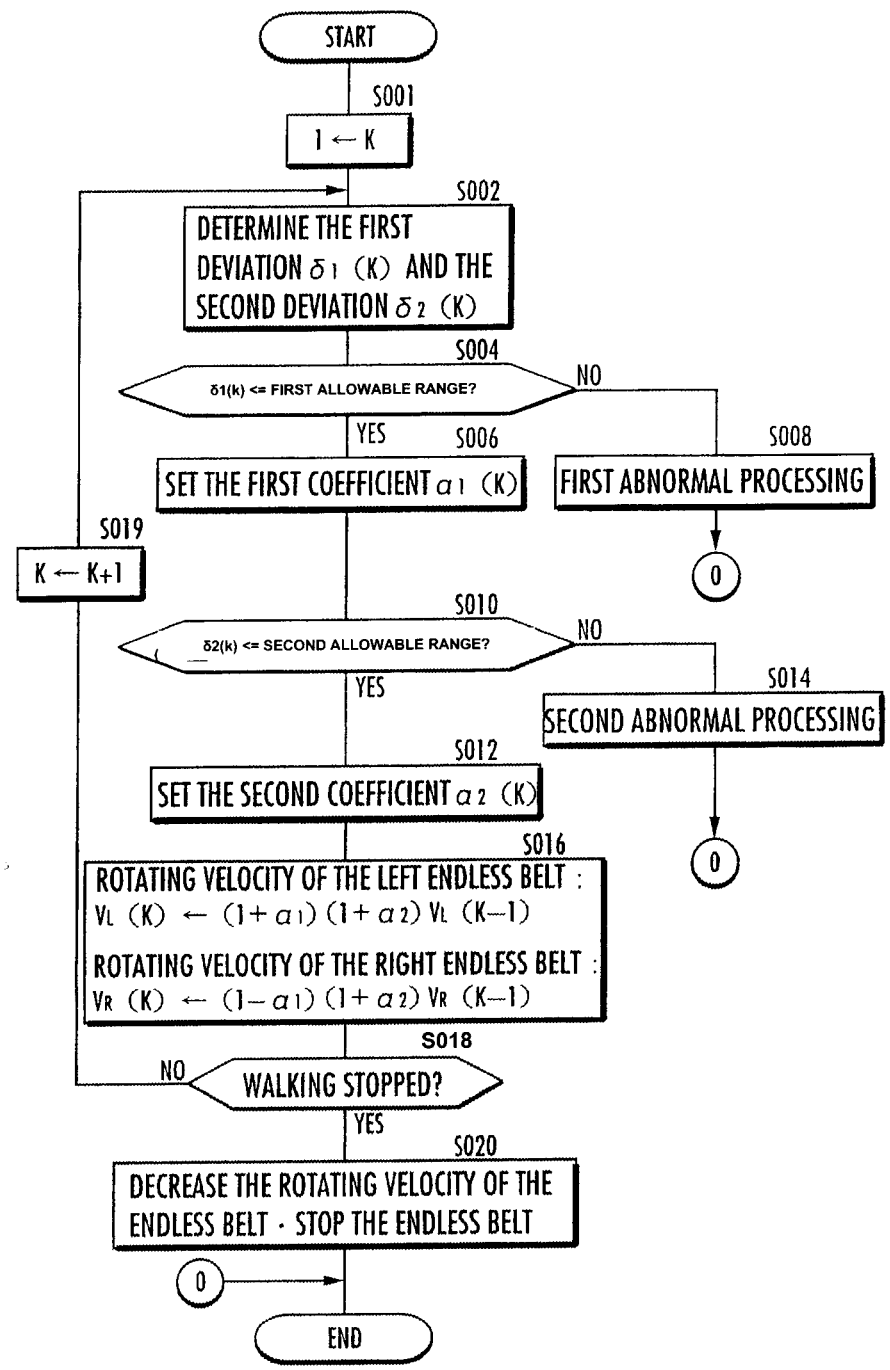
FIG. 3 is a diagram illustrating the function of the locomotive performance testing apparatus of the present invention.
Figure 4:
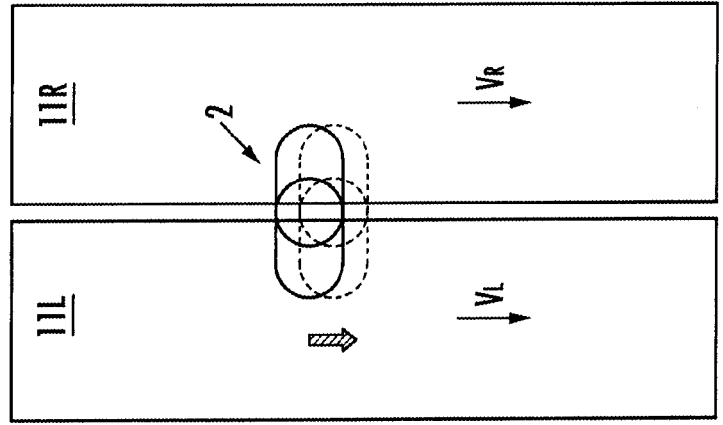
FIG. 4 is a diagram illustrating the function of the locomotive performance testing apparatus of the present invention.
Figure 4:
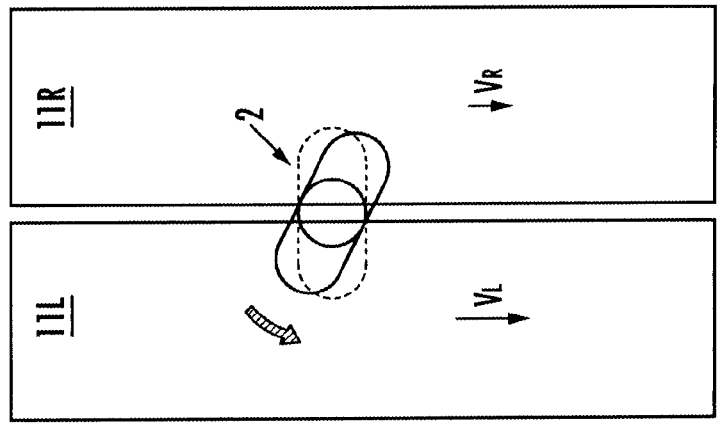
Figure 4:
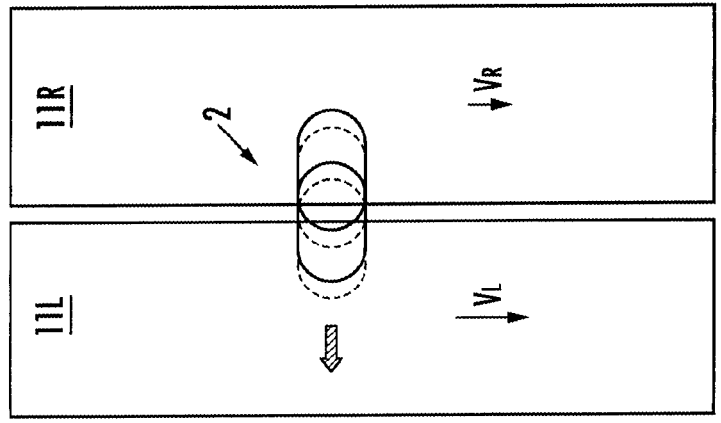

After the treadmill 10 and the robot 2 are activated to work respectively, an index k indicating a control cycle is set to 1 (FIG. 3/S001). Thereafter, the first deviation $\delta_1(k)$ is determined by the first processing element 110 and the second deviation $\delta_2(k)$ is determined by the second processing element 120 (FIG. 3/S002). The first deviation $\delta_1(k)$ is defined as being positive when the robot 2 is deviated to the right side of the first desired position and being negative when the robot 2 is deviated to the left side of the first desired position. The second deviation $\delta_2(k)$ is defined to be positive when the robot 2 is deviated to the front side of the second desired position and to be negative when the robot 2 is deviated to the rear side of the second desired position.

Subsequently, whether the first deviation $\delta_1(k)$ is within a first allowable range is determined (FIG. 3/S004).

In the case where the determination result is positive (FIG. 3/S004 . . . YES), namely the first deviation $\delta_1(k)$ is within the first allowable range, a first coefficient $\alpha_1(k)$ is set (FIG. 3/S006). The first coefficient $\alpha_1(k)$ defines the magnitude of a difference between the velocity $v_L$ of the left endless belt 11L and the velocity $v_R$ of the right endless belt 11R. The difference therebetween is used to match the position of the robot 2 to the first desired position (the middle position between the left endless belt 11L and the right endless belt 11R) in the first direction (the lateral direction of the treadmill 10), as illustrated by the dashed arrow in FIG. 4(a).

The first coefficient $\alpha_1(k)$ is defined as a continuous or discontinuous increasing function of the first deviation $\delta_1(k)$ and equals to zero when the first deviation $\delta_1(k)$ is zero.

As aforementioned, the first deviation $\delta_1(k)$ is defined as being positive when the robot 2 is deviated to the right side of the first desired position and being negative when the robot 2 is deviated to the left side of the first desired position. Therefore, the first coefficient $\alpha_1(k)$ is positive when the robot 2 is deviated to the right side of the first desired position and will become greater as the deviation to the right side increases. Moreover, the first coefficient $\alpha_1(k)$ is negative when the robot 2 is deviated to the left side of the first desired position and will become smaller as the deviation to the left side increases. By setting the first coefficient $\alpha_1(k)$ in this way, the position of the robot 2 can approach gradually to the first desired position in the first direction and match it finally.

In addition, it is acceptable for the first processing element 110 to determine a deviation angle of the progressing direction of the robot 2 from the frontward direction of the treadmill 10 as the first deviation $\delta_1(k)$. The deviation angle is obtained via an analyzing process on an image obtained by a camera (not shown) provided upper of the robot 2.

In this case, the first deviation $\delta_1(k)$ is defined as being positive when the direction of the robot 2 is deviated to the right side of the frontward direction and being negative when the direction of the robot 2 is deviated to the left side of the frontward direction.

As aforementioned, the first coefficient $\alpha_1(k)$ is defined as a continuous or discontinuous increasing function of the first deviation $\delta_1(k)$ and equals to zero when the first deviation $\delta_1(k)$ is zero. Therefore, the first coefficient $\alpha_1(k)$ is positive when the direction of the robot 2 is deviated to the right side of the frontward direction and will become greater as the deviation to the right side increases. Moreover, the first coefficient $\alpha_1(k)$ is negative when the direction of the robot 2 is deviated to the left side of the frontward direction and will become smaller as the deviation to the left side increases.

The first coefficient $\alpha_1(k)$ defines the magnitude of a difference between the velocity $v_L$ of the left endless belt 11L and the velocity $v_R$ of the right endless belt 11R. The difference therebetween is used to match the direction of the robot 2 to the frontward direction of the treadmill 10, as illustrated by the dashed arrow in FIG. 4(b).

On the other hand, in the case where the determination result is negative (FIG. 3/S004 . . . NO), namely the position of the robot 2 is excessively deviated from the first desired position in the first direction, a first abnormal processing is performed (FIG. 3/S008). As a result, for example, the robot 2 is lifted by the lifter 14, or the motors 12L and 12R are decelerated gradually to a stop, the test is terminated forcibly. The first abnormal processing may be performed in the case where either one of the first limit sensors 114L and 114R detects that some parts of the robot 2, especially the legs 22L and 22R thereof, have gone beyond the allowable range on the treadmill 10 laterally.

Thereafter, whether the second deviation $\delta_2(k)$ is within a second allowable range is determined (FIG. 3/S010).

In the case where the determination result is positive (FIG. 3/S010 . . . YES), a second coefficient $\alpha_2(k)$ is set (FIG.

3/S012). The second coefficient $\alpha_2(k)$ defines the velocity $v_L$ of the left endless belt 11L and the velocity $v_R$ of the right endless belt 11R for matching the position of the robot 2 to the second desired position in the second direction, as illustrated by the dashed arrow in FIG. 4(c).

The second coefficient $\alpha_2(k)$ is a function, having the second deviation $\delta_2(k)$ as a variant. The second coefficient $\alpha_2(k)$ is defined as a continuous or discontinuous increasing function of the second deviation $\delta_2(k)$ and equals to zero when the second deviation $\delta_2(k)$ is zero.

As aforementioned, the second deviation $\delta_2(k)$ is defined as being positive when the robot 2 is deviated to the front side of the second desired position and being negative when the robot 2 is deviated to the rear side of the second desired position. Therefore, the second coefficient $\alpha_2(k)$ is positive when the robot 2 is deviated to the front side of the second desired position and will become greater as the deviation to the front side increases. Moreover, the second coefficient $\alpha_2(k)$ is negative when the robot 2 is deviated to the rear side of the second desired position and will become smaller as the deviation to the rear side increases. By setting the second coefficient $\alpha_2(k)$ in this way, the robot 2 can approach gradually to the second desired position from the initial position. In the case where the robot 2 is positioned close to the second desired position, it can approach the second desired position relatively fast.

On the other hand, in the case where the determination result is negative (FIG. 3/S010 ... NO), namely the position of the robot 2 is excessively deviated from the second desired position in the second direction, a second abnormal processing is performed (FIG. 3/S014). As a result, for example, the robot 2 is lifted up by the lifter 14, or the motors 12L and 12R are decelerated gradually to a stop, the test is terminated forcibly. The second abnormal processing may be performed in the case where either one of the second limit sensors 1241 and 1242 detects that some parts of the robot 2, especially the legs 22L and 22R thereof, have gone beyond the allowable range on the treadmill 10 anteroposteriorly. In addition, the second abnormal processing may be the same as or different from the first abnormal processing.

After setting the first coefficient $\alpha_1(k)$ and the second coefficient $\alpha_2(k)$, the motions of each of the motors 12L and 12R are controlled by the motor controlling element 100, and the velocity $v_L(k)$ of the left endless belt 11L and the velocity $v_R(k)$ of the right endless belt 11R are controlled according to equations (1) and (2), respectively (FIG. 3/S016).

$$v_L(K)=(1+\alpha_1(k))(1+\alpha_2(k))v_L(k-1) \quad (1)$$

$$v_R(K)=(1-\alpha_1(k))(1+\alpha_2(k))v_R(k-1) \quad (1)$$

The factors $(1+\alpha_1(k))$ and $(1-\alpha_1(k))$ bring a velocity difference between the velocity $v_L$ of the endless belt 11L and the velocity $v_R$ of the endless belt 11R. As a result, as illustrated in FIG. 4(a), in the case where the standing position of the robot 2 is deviated to the right side of the first desired position in the lateral direction, the standing position is corrected to the left side, as illustrated by the dashed arrow. On the other hand, in the case where the standing position of the robot 2 is deviated to the left side of the first desired position in the lateral direction, the standing position is corrected to the right side. Moreover, as illustrated in FIG. 4(b), in the case where the direction of the robot 2 is deviated to the right side from the frontward direction, the direction will be corrected counterclockwise when viewed from above, as illustrated by the dashed arrow. On the other hand, in the case where the direction of the robot 2 is deviated to the left side from the frontward direction, the direction will be corrected clockwise when viewed from above.

Moreover, the factor $(1+\alpha_2(k))$ adjusts the velocity $v_L$ of the endless belt 11L and the velocity $v_R$ of the endless belt 11R. As a result, as illustrated in FIG. 4(c), in the case where the standing position of the robot 2 is deviated to the front side of the second desired position in the anteroposterior direction, the standing position is corrected to the rear side, as illustrated by the dashed arrow. On the other hand, in the case where the standing position of the robot 2 is deviated to the rear side of the second desired position in the anteroposterior direction, the standing position is corrected to the front side.

Subsequently, whether the robot 2 is in motion is determined (FIG. 3/S018). In the case where the robot 2 is determined to be in motion (FIG. 3/S018 ... NO), the index k is increased by a number of "1" (FIG. 3/S019) and the above-mentioned processes, such as the determination of the second deviation $\delta_2(k)$ and the like, are repeated (FIG. 3/S002 to S018). On the other hand, in the case where the robot 2 is determined to be motionless (FIG. 3/S018 ... YES), the motor controlling element 100 stops the motion of the motors 12L and 12R gradually (FIG. 3/S020).

According to the locomotive performance testing apparatus 1 of the present invention which exhibits the aforementioned functions, the locomotive performance of the robot 2 is tested by moving the legs 22L and 22R of the robot (test subject) 2 on two endless belts 11L and 11R which are driven to rotate individually.

In the case where the position of the robot 2 is deviated from the first desired position (the middle position between the left endless belt 11L and the right endless belt 11R) in the first direction due to the reasons such as the movements of the legs 22L and 22R become unbalanced or the like during the test, the motions of the motors 12L and 12R are controlled so as to offset the deviation (the first deviation $\delta_1(k)$) (refer to FIG. 3/S006 and S016).

In detail, the velocity $v_L$ of the endless belt 11L and the velocity $v_R$ of the endless belt 11R are set according to the equations (1) and (2), respectively. The factor $(1-\alpha_1(k))$ at the right side of the equation (1) and the factor $(1+\alpha_1(k))$ at the right side of the equation (2) bring a velocity difference between the velocity $v_L$ and the velocity $v_R$. As a result, the position of the robot 2 alters so as to approach the first desired position in the first direction as illustrated in FIG. 4(a) by the dashed arrow; thereby, the unbalance of the movements of the legs 22L and 22R may be corrected according to the motions of the endless belts 11L and 11R. Accordingly, the locomotive performance test on the robot 2 may be performed so as to match the position of the robot 2 to the first desired position in the first direction.

In addition, the left-turning or right-turning performance of the robot 2 may be tested while maintaining the direction of the robot 2 toward the frontward direction. For example, by adjusting the rotating velocity of the left endless belt 11L higher than that of the right endless belt 11R, the right-turning performance of the robot 2 may be tested while maintaining the direction of the robot 2 frontward. Note that the velocity difference between the endless belts 11L and 11R may be controlled in accordance to the turning performance of the robot 2.

Furthermore, in the case where the position of the robot 2 is deviated from the second desired position in the second direction due to the reason that the tempo or the like of the movements of the legs 22L and 22R has been altered during the locomotive performance test of the robot 2, the motions of motors 12L and 12R are controlled so as to offset the deviation (the second deviation $\delta_2(k)$) (refer to FIG. 3/S012 and S016).

In detail, the velocity $v_L$ of the endless belt 11L and the velocity $v_R$ of the endless belt 11R are set according to the equations (1) and (2), respectively. The velocity $v_L$ and the velocity $v_R$ are adjusted by the factor $(1+\alpha_2(k))$ at the right sides of the equations (1) and (2). Accordingly, the tempo alteration or the like on the movements of the legs 22L and 22R may be corrected according to the motions of the endless belts 11L and 11R. Thereby, the locomotive performance test on the robot 2 may be performed so as to match the position of the robot 2 to the second desired position in the second direction.

Moreover, in the case where the first deviation $\delta_1(k)$ goes beyond the first allowable range, the first abnormal processing different to the normal ones, such as lifting the robot 2 by the lifter 14, stopping the motor 12 and the like, is performed (FIG. 3/S004 . . . No, S008). In the case where the second deviation $\delta_2(k)$ goes beyond the second allowable range, the second abnormal processing different to the normal one, such as lifting the robot 2 by the lifter 14, stopping the motor 12 and the like, is performed (FIG. 3/S010 . . . No, S014). As a result, the robot 2 may be prevented from deviating from the endless belt 11 to contact the objects around the treadmill 10.

In the above embodiments, the locomotive performance is tested on the robot 2. As another embodiments, the walking or running performance test may be performed on animals such as human or a horse, or the locomotive performance may be performed on a device movable on a pair of tires. The locomotive performance of a mobile device having 3 or more legs or tires may be performed on a treadmill having a plurality of endless belts corresponded to one leg or one leg set. For example, the locomotive performance of a robot having 4 legs may be tested on a treadmill having one endless belt corresponding to the 2 left legs of the robot and the second endless belt corresponding to the 2 right legs of the robot. The locomotive performance of the robot 2 may be tested by adjusting the anteroposterior position of the robot 2 according to the motions of one endless belt.

The load added to the lifter 14 or the alteration on the load is determined by the motor controlling element 100. In the case where the load or the alteration on the load is beyond an allowable range, the abnormal processing may be performed by lifting the robot 2 through the lifter 14, stopping the motions of the motors 12 and the like. According thereto, the locomotive performance test may be prevented from being continued when the robot 2 is highly probable to be in an unbalanced state.

In the above-mentioned embodiments, the standing position of the robot 2 is determined by the first sensor 112 constituted by the light-receiving elements and the second sensor 122 emitting laser lights. As another embodiment, the standing position of the robot 2 may be determined by a wide-range distance laser sensor of a scanning type.

Although the present invention has been explained in relation to the preferred embodiments and drawings but not limited, it should be noted that other possible modifications and alterations made without departing from the gist and scope of the invention will be comprised in the present invention. Therefore, the appended claims encompass all such changes and modifications as falling within the gist and scope of the present invention.

What is claimed is:

1. A locomotive performance testing apparatus configured to test locomotive performance of a robot as a test subject capable of moving according to movements of a pair of left and right legs thereof, comprising:
   a pair of endless belts disposed in parallel according to a displacement of the pair of left and right legs;
   a pair of motors to drive the pair of endless belts to rotate respectively;
   a first processing element configured to determine a directional deviation of the robot deviated with respect to a forward direction or a positional deviation of the robot deviated from a first desired position in a lateral direction as a first deviation when the pair of left and right legs are activated to move the robot toward the forward direction on the pair of rotating endless belts driven by the pair of motors respectively; and
   a motor controlling element configured to control motions of the pair of motors respectively such that a speed of the endless belt on a left side becomes faster than a speed of the endless belt on a right side among the pair of endless belts in a case where the first deviation indicates that a direction of the robot deviates to the right side with respect to the forward direction or that a position of the robot deviates to the right side from the first desired position, while the speed of the endless belt on the right side becomes faster than the speed of the endless belt on the left side among the pair of endless belts in a case where the first deviation indicates that the direction of the robot deviates to the left side with respect to the forward direction or that the position of the robot deviates to the left side from the first desired position.

2. The locomotive performance testing apparatus according to claim 1, wherein the motor controlling element is configured to control the motions of the pair of motors respectively in a manner different from a normal one when the first deviation determined by the first processing element is beyond a first allowable range.

3. The locomotive performance testing apparatus according to claim 1, further including a second processing element configured to determine a positional deviation of the robot deviated from a second desired position in the forward direction as a second deviation when the pair of left and right legs are activated to move the robot toward the forward direction on the pair of rotating endless belts driven by the pair of motors, respectively, and the motor controlling element is configured to control the motions of the pair of motors, respectively, so as to offset the first deviation determined by the first processing element and the second deviation determined by the second processing element, respectively.

4. The locomotive performance testing apparatus according to claim 3, wherein the motor controlling element is configured to control the motions of the pair of motors, respectively, in a manner different from a normal one when the second deviation determined by the second processing element is beyond a second allowable range.

5. A locomotive performance testing apparatus configured to test locomotive performance of a robot locomobile according to movements including leaving the ground and landing on the ground of a pair of left and right legs, comprising:
   an endless belt;
   a pair of motors to drive the endless belt to rotate;
   a first processing element configured to determine a positional deviation of the robot deviated from a first desired position in a lateral direction different from a forward direction as a first deviation when the pair of left and right legs are activated to move the robot toward the forward direction on the rotating endless belt driven by the pair of motors; and a motor controlling element configured to control motions of the pair of motors, respectively, such that a speed of the endless belt on a left side becomes faster than a speed of the endless belt on a right side in a case where the first deviation indicates that a position of the robot deviates to the right side from the first desired position, while the speed of the endless belt on the right side becomes faster than the speed of the endless belt on the left side in a case where the first deviation indicates that the position of the robot deviates to the left side from the first desired position.

6. The locomotive performance testing apparatus according to claim 1, wherein the motor controlling element is configured to control motions of the pair of motors such that the speed of rotation of one of the pair of endless belts is different from the speed of rotation of one other of the pair of endless belts so as to offset the first deviation determined by the first processing element.

7. The locomotive performance testing apparatus according to claim 6, wherein the lateral direction is a direction across the pair of endless belts and the forward direction is a longitudinal direction from a front to rear of the pair of endless belts.

8. The locomotive performance testing apparatus according to claim 3, wherein the motor controlling element is configured to control motions of the pair of motors such that the speed of rotation of one of the pair of endless belts is different from the speed of rotation of one other of the pair of endless belts so as to offset the first deviation determined by the first processing element and the second deviation determined by the second processing element.

9. The locomotive performance testing apparatus according to claim 8, wherein lateral direction is a direction across the pair of endless belts and the forward direction is a longitudinal direction from a front to rear of the pair of endless belts.

10. The locomotive performance testing apparatus according to claim 1, wherein the lateral direction is a direction across the pair of endless belts and the forward direction is a longitudinal direction from a front to rear of the pair of endless belts.

11. The locomotive performance testing apparatus according to claim 5, wherein the motor controlling element is configured to control motions of the pair of motors such that the speed of rotation of the endless belt is varied so as to offset the first deviation determined by the first processing element.

12. The locomotive performance testing apparatus according to claim 11, wherein the lateral direction is a direction across the endless belt and the forward direction is a longitudinal direction from a front to rear of the endless belt.

13. The locomotive performance testing apparatus according to claim 5, wherein the lateral direction is a direction across the endless belt and the forward direction is a longitudinal direction from a front to rear of the endless belt.

* * * * *